United States Patent [19]

Seelbinder

[11] 3,724,951
[45] Apr. 3, 1973

[54] METHOD AND APPARATUS FOR DETERMINING RADIATION TRANSMISSION CHARACTERISTICS OF A GENERALLY TRANSPARENT MEDIUM

[75] Inventor: David C. Seelbinder, Rochester, N.Y.

[73] Assignee: Eastman Kodak Company, Rochester, N.Y.

[22] Filed: Aug. 31, 1971

[21] Appl. No.: 176,492

[52] U.S. Cl..............356/102, 250/218, 250/220 R, 356/104, 356/208
[51] Int. Cl....G01n 15/02, G01n 21/00, G01n 21/26
[58] Field of Search......356/102, 103, 104, 208, 206, 356/204; 250/218, 220 R

[56] References Cited

UNITED STATES PATENTS

| 3,640,627 | 2/1972 | Beattic et al. | 356/104 |
| 3,437,411 | 4/1969 | Rudomanski et al. | 356/89 |
| 3,603,689 | 9/1971 | Shelnutt | 356/103 |
| 3,506,360 | 4/1970 | Albert | 356/103 |
| 3,349,227 | 10/1967 | Martens et al. | 356/102 |
| 2,920,525 | 1/1960 | Appel et al. | 356/103 |

OTHER PUBLICATIONS

Particle Size Determination by Turbidimetry, R. V. Gledhill, Jr., Physical Chemistry, 66, 458 (1962).

Primary Examiner—Ronald L. Wibert
Assistant Examiner—U. P. McGraw
Attorney—Robert W. Hampton et al.

[57] ABSTRACT

A device for determining the spectral radiation transmission characteristics and size-frequency distribution of very small particles dispersed in a generally transparent liquid medium comprises a transparent sampling cell through which the liquid medium is moved at a desired rate and subjected to a beam of radiation by a suitable optical system. The optical system, which includes a rotatable, spectrally variable filter and a suitable mask limits the beam of radiation incident on one side of the cell to a narrow band, the peak wavelength of which is a function of angular displacement. On the opposite side of the sampling cell, a plurality of photosensitive detectors are arranged for generating an electrical signal from the radiation incident thereon that is in accordance with the amount of radiation emitted from the cell at various angles relative to the axis of the beam of radiation. A photosensitive detector is also arranged relative to the one side of the cell and the transmittance side of the filter to detect the radiation incident on the one side of the cell so as to provide a reference signal for relative measurement of the radiation emitted by the cell on the other side thereof. The signals derived from the plurality of detectors and from the reference detector are amplified and by suitable circuitry generate an analog output signal that corresponds to the spectral transmission characteristics of the liquid medium moving through the cell.

15 Claims, 4 Drawing Figures

PATENTED APR 3 1973　　3,724,951

DAVID C. SEELBINDER
INVENTOR.

BY *Lloyd F. Seebach*

AGENT

DAVID C. SEELBINDER
INVENTOR.

AGENT

METHOD AND APPARATUS FOR DETERMINING RADIATION TRANSMISSION CHARACTERISTICS OF A GENERALLY TRANSPARENT MEDIUM

FIELD OF THE INVENTION

The invention relates to a method and apparatus for determining the radiation transmission characteristics of very small particles dispersed in a generally transparent liquid medium and, more particularly, to a method and apparatus by which such characteristics can be related to particle size distribution and rapid changes in such distribution as a function of time.

DESCRIPTION OF THE PRIOR ART

It is well-known in the art that the light scattering property or characteristic of small particles is a function of their size. The light scattering properties of unexposed and undeveloped photographic emulsions are used as a basis for empirical prediction of the size-frequency distribution of the silver halide grains in the emulsions. The diameter of small spherical particles can be computed from sample spectral transmittance measurements, as described in the article entitled PARTICLE-SIZE DISTRIBUTION DETERMINATION BY TURBIDIMETRY, by R. V. Gledhill, Jr., Physical Chemistry, 66, 458 (1962). The size-frequency distribution of small non-spherical particles can also be determined by X-ray microscopy measurement or indirectly by spectrogoniophotometric analysis. Such analysis made with respect to a wide variety of emulsion coatings containing specified amounts of silver and gelatin have been functionally related to grain-size data obtained from photomicrographic measurements of emulsion smears. However, while these methods of measuring grain-size distribution have been useful in emulsion research and technology, their application has been limited because of the time required to obtain and correlate the data. As a result, these methods, which are well-known to those skilled in the art, do not readily lend themselves to a commercial, in-line production process for a liquid medium, in which such measurements must be made to maintain control of the process and subsequent manufacturing operations.

SUMMARY OF THE INVENTION

One object of the invention is to provide a method and apparatus for determining the size-frequency distribution of very small particles dispersed in a generally transparent liquid medium.

Another object of the invention is to provide a method and apparatus by which the size-frequency distribution of very small particles in a generally transparent liquid medium can be determined in an "in-line" manufacturing operation for the liquid medium containing such particles.

Still another object of the invention is a method and apparatus by which the size-frequency distribution of very small particles in a generally transparent liquid medium is useful to control the formulation process for the liquid medium, as well as subsequent manufacturing operations.

Yet another object of the invention is to provide a method and apparatus for determining the size-frequency distribution of very small particles dispersed in a generally transparent liquid medium wherein such distribution is undergoing a rapid change, such as occurs in silver halide grains during the formation of photographic emulsion precipitation and ripening processes.

These and other objects and advantages of the invention will be apparent to those skilled in the art by the description which follows.

The method and apparatus for attaining the above-mentioned objects are considered to be unique in that the size-frequency distribution of very small particles dispersed in a generally transparent liquid medium can be measured while they are undergoing a rapid change. Such measurements have been found to be very useful in the control of processes and subsequent manufacturing operations, particularly with respect to the production of photographic emulsions.

The objects of the invention are attained by a device comprising a transparent sampling cell through which a generally transparent liquid medium, such as a photographic emulsion which has particles dispersed therein, can flow at a desired rate. A source providing a beam of radiation is directed along an axis generally normal to one side of the cell by a suitable optical system. A rotatable, spectrally variable filter is arranged intermediate the source and the sampling cell. The filter transmits a narrow band of radiation, the peak wavelength of which is a function of angular displacement. On the opposite side of the sampling cell, a plurality of lenses are arranged in a generally arcuate configuration relative to the cell, each lens being associated with a photosensitive detector for generating an electrical signal from the radiation incident thereon that is in accordance with the amount of radiation emitted from the cell at various angles relative to the axis of the beam of radiation. A photosensitive detector is also arranged relative to the one side of the cell and the transmittance side of the filter to detect the radiation incident on the one side of the cell so as to provide a reference signal for relative measurement of the radiation emitted by the cell on the other side thereof. Suitable indicia or marks are provided on the filter for controlling the initiation of a recorder and for indicating the transmittal of preselected wavelengths of radiation. The signals derived from the radiation transmittance detectors and from the radiation reference detector are amplified and by suitable circuitry generate an analog output signal that corresponds to the spectral transmission characteristic of the liquid medium moving through the cell. This signal is related to wavelength and a visual presentation of this relationship is displayed by the recorder. By relating the spectral transmission signals to empirical information programmed in a computer, an output can be obtained from the computer which will provide a particle size-frequency distribution plot. The data can be used to obtain information which relates the changes in particle size-frequency distribution as a function of time.

DESCRIPTION OF THE DRAWINGS

Reference is now made to the accompanying drawing wherein like reference characters designate like parts and wherein.

DESCRIPTION OF THE PREFERRED EMBODIMENT

Figure 1:
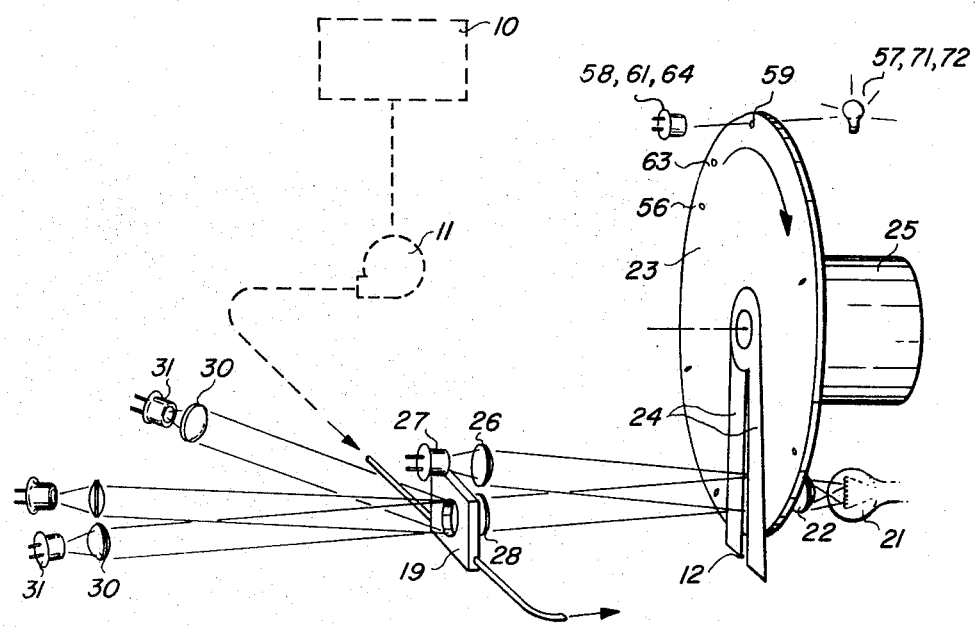
FIG. 1 is a schematic, perspective view showing the relationship of the various elements comprising the device for determining the transmission radiation characteristics of a generally transparent liquid medium.

With reference particularly to FIG. 1, a generally transparent liquid medium, such as a photographic emulsion, can be contained in a receptacle 10 which is connected to a sample cell 19 by suitable piping and a pump 11. The pump 11 moves the emulsion at a desired rate, which may be uniform or variable and continuous or intermittent, through a flow path including the sample cell 19. This cell is provided with transparent side plates so the liquid medium can be readily exposed to radiation. A source of radiation which emits over a broad spectral band including ultraviolet (UV) and infrared (IR) can be used. In the disclosed embodiment, a tungsten lamp 21 is used and has a lens 22 associated therewith for collimating the radiation emitted by lamp 21 along an axis that is normal to the one (incident) side of cell 19.

A rotating, spectrally variable filter 23, which transmits a narrow band width of radiation, the wavelength of which is a function of angular displacement, is arranged between the source of radiation 21 and the cell 19 and is driven at a continuous, uniform rate by a motor 25. A pair of adjustable plates 24 are mounted relative to the optical axis of filter 23 and form a slit 12 for controlling the bandwidth of radiation incident on the cell 19 and the liquid medium therein.

A lens 26 and a photosensitive detector 27 are optically aligned and arranged so the beam of radiation incident on the cell 19 will also be incident on lens 26 which focuses the radiation on detector 27 so as to generate an electrical signal corresponding thereto that will serve as a reference signal with respect to the signals derived from the radiation incident on the cell and transmitted by the liquid medium as described more fully hereinafter. A field lens 28 is arranged adjacent the one side of the cell 19 facing the filter 23 to control and limit the spread of the beam of radiation incident on the cell 19.

On the opposite side of cell 19, a plurality of lenses 30 and photosensitive detectors 31 are aligned in sets, that is, each of lenses 30 is associated with a respective detector 31, each set being arranged to intercept and detect radiation transmitted by the liquid medium flowing through cell 19, the radiation being emitted by cell 19 at various angles relative to the axis of the beam of radiation that is directed onto the cell 19 via lamp 21, lens 22, filter 23, and lens 28. One of the lenses 30 and one of the detectors 31 are arranged relative to the axis per se with respect to which the lenses 22 and 28 and the lamp 21 are also aligned, such detector providing an electrical signal which will be indicative of the radiation incident on cell 19 and transmitted with substantially zero scatter.

The output signals from the detectors include a number of variables that must be taken into consideration if a true determination of the radiation transmission characteristics of the liquid medium is to be made. All of the variables will be sensed by the detectors 31 so it becomes necessary to provide a reference with respect to the scattered or emitted radiation. For this reason, detector 27 is placed in the system. The variables that must be considered are: (1) the spectral emittance of the source of radiation (lamp 21), i.e. at different wavelengths variable amounts of energy are released; (2) the spectral transmittance of the filter 23, i.e. at different wavelength bands variable fractions of incident energy are transmitted; and (3) the spectral efficiency of the detectors 31 per se, i.e. for each wavelength a given amount of energy incident on a detector will produce a different level of output signal. When these factors are considered, the difference between the signal generated by detector 27 and that generated by each of cells 31 will then be a true and accurate indication of the relative spectral radiation transmitted or emitted by the liquid medium on axis and at various angles and, hence, its spectral transmission (spectrogoniophotometric) characteristics.

Hence, the electrical signal generated by the detector 27 will be derived from the radiation from lamp 21 transmitted by the filter 23 as well as the spectral sensitivity of the detector 27 per se. This signal is amplified by a logarithmic amplifier 40 and transmitted to a differential amplifier 41, see FIG. 2. Also, this same signal will be transmitted to an intensity modulator 42 which includes a loop control for maintaining the signal generated by detector 27 at a generally uniform level to minimize the total signal range generated by detectors 31 that must be logarithmically amplified.

Figure 2:
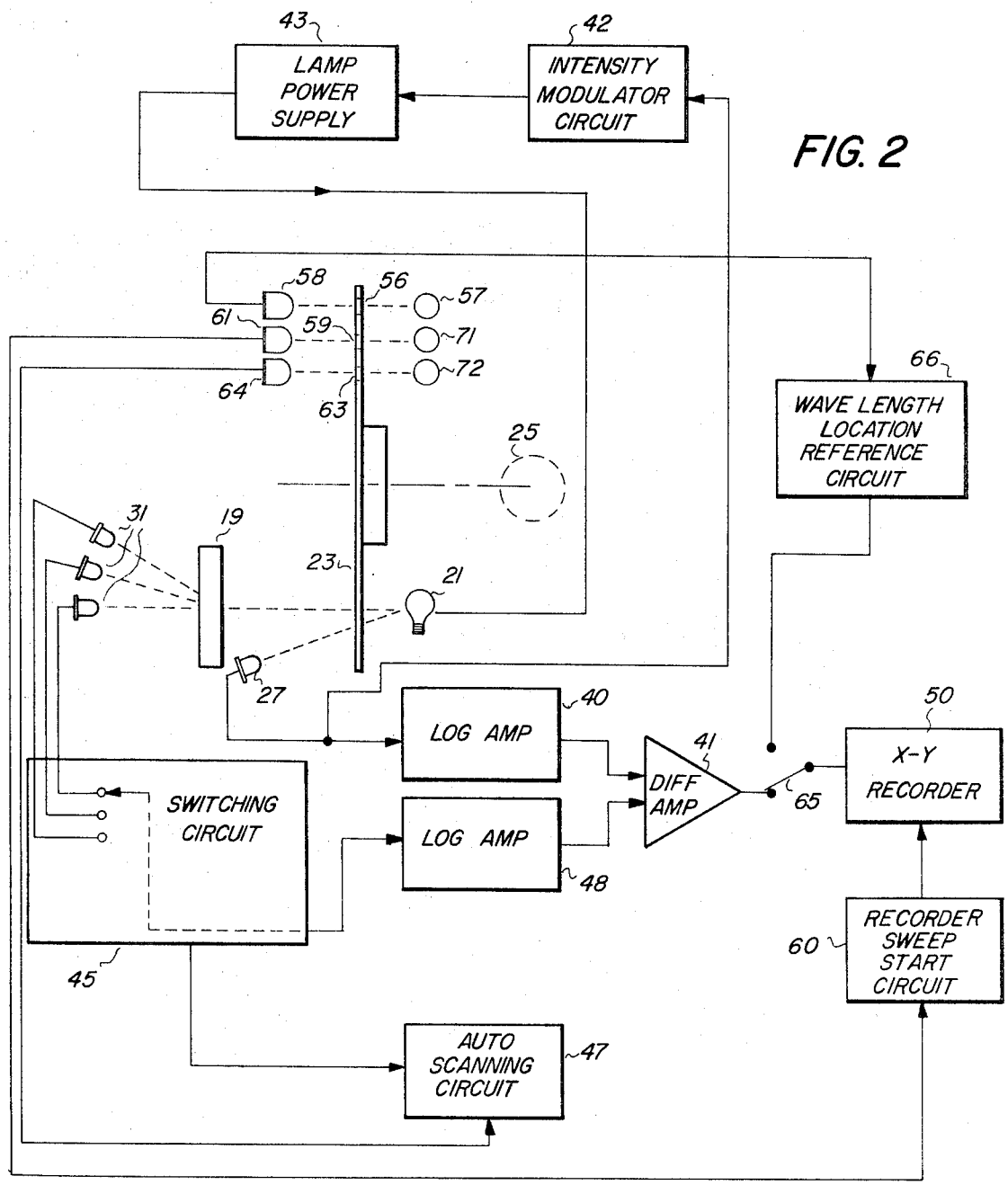
FIG. 2 is a schematic view showing the circuitry in block form in conjunction with the device to provide a visual display of the particle size-frequency distribution and spectral transmission characteristics as accomplished by the device generally disclosed in FIG. 1.

It is to be understood, as the filter 23 is rotated, the radiation incident on cell 19 is continuously changing. This change is with respect to the spectral characteristics of the radiation; and, as such, the reflection or diffraction of this light by the particles dispersed in the liquid medium will provide different angles of scatter to the radiation which will be picked up by each of the detectors 31 as they are individually and sequentially rendered operative. As shown in FIG. 2, the detectors 31 are controlled so as to be sequentially operated by means of switching circuit 45. An automatic scanning circuit 47 is provided for controlling the operation of circuit 45. During normal operation, scanning circuit 47 will provide for automatic and sequential operation of the detectors 31 so that a series of electrical signals are generated, each in accordance with the radiation transmitted through the liquid medium and scattered by the particles, as detected from a particular angle by the energized detector 31. The signal generated by each of detectors 31 is amplified by a logarithmic amplifier 48 and transmitted to the differential amplifier 41. The two signals, the one from the amplifier 40 (detector 27) and the other from the amplifier 48 (energized detector 31) are differentiated by amplifier 41 and a series of output signals (analog data) is obtained which correspond to the spectral transmission density characteristic of the liquid medium on axis and at various scatter angles. This series of signals can then be transmitted to an X-Y recorder 50 which will provide a visual display which relates the transmission characteristics to wavelengths of radiation at various scatter angles.

Figure 4:
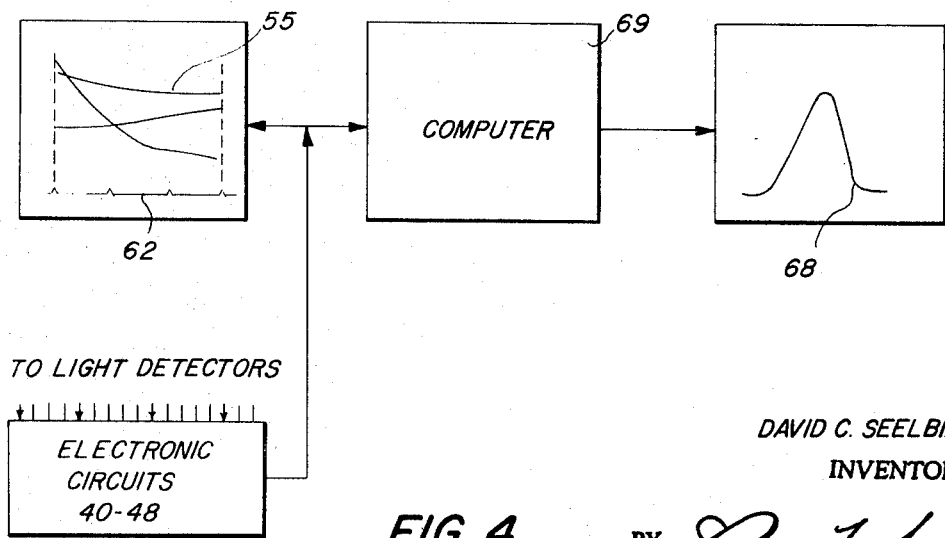
FIG. 4 is a block diagram showing the manner in which the signals generated by the photosensitive detectors can be used to provide an analog output display and a size-frequency distribution display.
Figure 3:
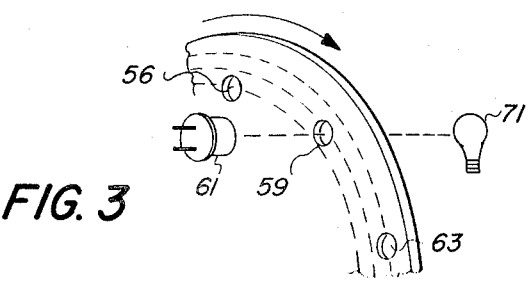
FIG. 3 is a partial perspective view showing the manner in which photosensitive detectors associated with a rotatable filter of variable spectral transmittance are used to control operation of a recorder and to designate periodically the wavelength of the radiation transmitted by the filter.

With reference to FIG. 3, the filter 23 is calibrated with indicia so as to provide a signal which controls initiation of the X-Y recorder 50, a signal which initiates scanning circuit 47, and a series of signals corresponding to wavelength designations which are related to the optical characteristics of filter 23. The latter series of signals is also used with reference to the display indicated by 55 in FIG. 4. The variable spectral transmission of light by filter 23 is carefully measured; and at several points, for example, those equivalent to 4,000, 5,000, 6,000, and 7,000 Angstrom units, an aperture 56 is placed in the filter adjacent its peripheral edge as shown in FIG. 3. A light source 57 is arranged on one side of the filter and a photodetector 58 is aligned with the light source and on the opposite side of the filter. In addition, an aperture 59 and an aperture 63 are provided, which in relation to the apertures 56, are arranged such that a signal will be derived at the proper time to first initiate the auto-scanning circuit 47 and then to initiate the recorder start circuit 60, the apertures 59 and 63 being spaced radially inward or outward relative to the apertures 56, see FIG. 3. A detector 61 and a detector 64 is also associated with each respective aperture 59 and 63, as well as a light source 71 and 72. It is to be understood that the signals derived from apertures 56, 59 and 63 can be generated by means other than that just described. For example, magnetic areas can be placed on filter 23 in accordance with the apertures sensed by a pick-up head. Also, the apertures per se can be replaced with transparent or opaque areas on filter 23 and sensed by photocells. Other means can also be devised to generate the necessary signals. The display derived from the apertures 56 is indicated by the numeral 62 in FIG. 4 and comprises a series of blips, each representative of the particular wavelength designated by the respective aperture 56. While a switch 65 is shown in FIG. 2 as being movable between a position in which the signals from amplifier 41 are connected to recorder 50 or the signals from detector 58 are connected through a reference circuit 66 to recorder 50, the two sets of signals can be used as inputs when the recorder 50 is one that can produce more than one display as shown in FIG. 4. Otherwise, the wavelength display 62 will have to be recorded before or after the transmission display 55.

Empirical formulas with measured data and the analog data from amplifier 41 can, through the medium of a computer 69, provide a basis for obtaining a size-frequency plot of the particles as shown in FIG. 4 and designated by the numeral 68. As a result, data can be obtained which relates the spectral transmission characteristics to particle size frequency distribution.

While the detectors 27 and 31 have been generally described as photosensitive detectors, other types of detectors, such as a photomultiplier tube, can be used as well. Also, detectors 31 have been described as being arranged in a generally arcuate format with respect to cell 19, see FIG. 2; however, they can be arranged in any manner so long as an angular displacement is obtained. The arrangement of the lens 26 and detector 27 may also take another format to provide the same degree of sensing control. It should be evident to those skilled in the art that variations, such as those described hereinabove, can be made and will in no way affect the function of the method or device nor the results obtained.

This invention has been described in detail with particular reference to the preferred embodiments thereof, but it will be understood that variations and modifications may be effected within the spirit and scope of the invention.

I claim:

1. A method of determining the spectral radiation transmission characteristics and size-frequency distribution of very small particles dispersed in a generally transparent, liquid medium, the steps comprising:

flowing the liquid medium at a desired rate past a source of radiation having broad spectral characteristics;

continuously varying the spectral characteristics of a narrow bandwidth of the radiation incident on the liquid medium;

generating an electrical reference signal of generally uniform amplitude from the radiation of narrow bandwidth;

detecting continuously at a number of different positions relative to the liquid medium a change in intensity of the transmitted radiation as the spectral characteristics of the narrow bandwidth varies;

generating sequentially with respect to each different position an electrical signal corresponding to the change in the transmitted radiation throughout the variation in the narrow bandwidth spectral characteristics; and differentiating the electrical reference signal and the electrical signal generating at each different position for producing an analog data output signal indicative of the spectral transmission density characteristics of the liquid medium.

2. The method in accordance with claim 1 wherein the spectral characteristics of the radiation are varied at least between about 4,000 to about 7,000 Angstrom units.

3. The method in accordance with claim 1 including the step of generating a series of signals indicative of preselected spectral characteristics of the radiation incident upon the liquid medium.

4. The method in accordance with claim 3 including the step of recording the analog data output signals as a display of spectral transmission density characteristics relative to the preselected spectral characteristics of the radiation incident upon the liquid medium.

5. The method in accordance with claim 1 including the step of modulating the intensity of the source of radiation to maintain the generally uniform amplitude of the reference signal.

6. A device for determining the spectral radiation transmission characteristics and size-frequency distribution of very small particles dispersed in a generally transparent, liquid medium, comprising:

a source of radiation having broad spectral characteristics;

means connected to a source of the liquid medium for moving and directing the latter in a flow path at a desired rate past said light source;

means arranged between the source of radiation and the flow path for continuously varying the spectral characteristics of a narrow bandwidth of the radiation incident on the liquid medium;

means responsive to the spectral characteristics of the narrow bandwidth of radiation for generating a generally continuous electrical reference signal corresponding thereto;

means arranged in a plurality of different positions relative to the flow path so as to intercept the transmitted light scattered by the dispersed particles in the liquid medium for continuously detecting a change in intensity of the transmitted radiation as the spectral characteristics of the narrow bandwidth varies;

means responsive to the varying means for rendering each detecting means sequentially operative for generating an electrical signal corresponding to the change in the transmitted radiation throughout the variation in the narrow bandwidth spectral characteristics; and means responsive to the electrical reference signal and the electrical signal generated at each different position for differentiating the same and for producing an analog data output signal indicative of the spectral transmission density characteristics of the liquid medium.

7. A device in accordance with claim 6 including means responsive to the analog data output signal for producing a visual display of the spectral transmission density characteristics of the liquid medium.

8. A device in accordance with claim 7 wherein the means for varying the spectral characteristics of the narrow bandwidth comprises a rotatable, spectrally variable filter having indicia for indicating one end of a spectral range and for indicating at least a number of divisions of the range.

9. A device in accordance with claim 8 wherein said filter is provided with control indicia for initiating the electrical signal generating means.

10. A device in accordance with claim 9 including means responsive to the control indicia, the analog data output signal and the indicating indicia for producing a visual display of preselected spectral values for the filter relative to the spectral transmission density characteristics of the liquid medium.

11. A device in accordance with claim 6 wherein the generating means for the electrical signal includes a photosensitive detector arranged in each different position and means for actuating the detectors sequentially.

12. A device in accordance with claim 6 including means responsive to the electrical signal derived from the detecting means in each different and empirical information for producing a display of particle size-frequency distribution in the liquid medium.

13. A device in accordance with claim 6 including means for modulating the intensity of the source of radiation to maintain the reference signal at a generally uniform amplitude.

14. A device in accordance with claim 6 wherein said flow path comprises a cell having transparent sides between which said liquid medium is moved and through which the narrow bandwidth of continuously varying spectral radiation is directed.

15. A device in accordance with claim 14 wherein the means for generating the electrical signal in each different position comprises a plurality of photosensitive detectors spaced from and angularly disposed relative to the cell and in the path of the radiation transmitted by the liquid medium and scattered by the dispersed particles.

* * * * *